United States Patent
Lee

(10) Patent No.: US 7,456,650 B2
(45) Date of Patent: Nov. 25, 2008

(54) MEMORY SYSTEM WITH STABLE TERMINATION OF A PAIR OF DIFFERENTIAL SIGNALS TRANSMITTED VIA A PAIR OF TRANSMISSION LINES

(75) Inventor: Dong-yang Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 168 days.

(21) Appl. No.: 11/148,475

(22) Filed: Jun. 9, 2005

(65) Prior Publication Data
US 2005/0275425 A1    Dec. 15, 2005

(30) Foreign Application Priority Data
Jun. 14, 2004    (KR)    ............ 10-2004-0043448

(51) Int. Cl.
*H03K 17/16*    (2006.01)
*H03K 19/003*    (2006.01)
*H03K 19/0175*    (2006.01)

(52) U.S. Cl. ......................... 326/30; 326/83
(58) Field of Classification Search .............. 326/30, 326/86; 327/108
See application file for complete search history.

(56) References Cited

U.S. PATENT DOCUMENTS

| | | | | |
|---|---|---|---|---|
| 5,686,872 | A * | 11/1997 | Fried et al. | 333/22 R |
| 6,070,211 | A * | 5/2000 | Neal et al. | 710/106 |
| 6,744,275 | B2 * | 6/2004 | Chansungsan | 326/30 |
| 6,856,169 | B2 * | 2/2005 | Frans et al. | 326/82 |
| 6,864,704 | B1 * | 3/2005 | Wong et al. | 326/26 |
| 6,870,399 | B2 * | 3/2005 | Ngo et al. | 326/82 |
| 6,886,065 | B2 * | 4/2005 | Sides et al. | 710/305 |
| 6,895,535 | B2 * | 5/2005 | Sunter et al. | 714/704 |
| 6,985,009 | B2 * | 1/2006 | Nishio et al. | 326/30 |
| 7,058,131 | B2 * | 6/2006 | Dreps et al. | 375/257 |
| 2002/0113638 | A1 | 8/2002 | Takauchi et al. | 327/333 |
| 2004/0066210 | A1 * | 4/2004 | Zakai | 326/30 |
| 2005/0024084 | A1 * | 2/2005 | Hirata et al. | 326/30 |
| 2005/0066210 | A1 * | 3/2005 | Chen | 713/340 |
| 2005/0189961 | A1 * | 9/2005 | Frans et al. | 326/30 |
| 2005/0253622 | A1 * | 11/2005 | Dreps et al. | 326/31 |
| 2006/0082383 | A1 * | 4/2006 | Choi | 326/30 |
| 2006/0181303 | A1 * | 8/2006 | Dreps et al. | 326/29 |

FOREIGN PATENT DOCUMENTS

| | | |
|---|---|---|
| EP | 1215861 | 6/2002 |
| JP | 2001-127565 | 5/2001 |
| JP | 2001-136057 | 5/2001 |
| JP | 2002-185300 | 6/2002 |

* cited by examiner

*Primary Examiner*—James H. Cho
*Assistant Examiner*—Dylan White
(74) *Attorney, Agent, or Firm*—Mills & Onello LLP

(57) ABSTRACT

Provided is a memory system in which a pair of differential signals transmitted via a pair of transmission lines are prevented from being terminated at the same voltage during a standby mode, thereby preventing a receiver from entering an unstable state. The memory system includes a pair of transmission lines, a transmitter that outputs a pair of differential signals to the pair of transmission lines, and a receiver that receives the pair of differential signals via the pair of transmission lines. A first termination voltage is applied to one of the pair of transmission lines, and a second termination voltage is applied to the other transmission line. The first termination voltage is determined to be different from the second termination voltage.

6 Claims, 4 Drawing Sheets

US 7,456,650 B2

MEMORY SYSTEM WITH STABLE TERMINATION OF A PAIR OF DIFFERENTIAL SIGNALS TRANSMITTED VIA A PAIR OF TRANSMISSION LINES

BACKGROUND OF THE INVENTION

This application claims the priority of Korean Patent Application No. 2004-43448, filed on Jun. 14, 2004, in the Korean Intellectual Property Office, the contents of which are incorporated herein in their entirety by reference.

1. Field of the Invention

The present invention relates to a memory system, and more particularly, to a memory system with a structure that stably terminates a pair of differential signals transmitted via a pair of differential transmission lines in a standby mode.

2. Description of the Related Art

A memory system includes a memory device and a memory controller. The memory device is connected to the memory controller via signal transmission lines. In general, signal transmission lines are terminated at a predetermined voltage for stable transmission of signals.

FIG. 1 illustrates a conventional memory system that performs center tab termination (CTT) on a single-ended signal VSOUT. In the memory system of FIG. 1, a single-ended transmission line 15 is installed between a transmitter 11 and a receiver 13. If the transmitter 11 is a memory device, the receiver 13 is a memory controller, and vice versa. The transmitter 11 outputs the single-ended signal VSOUT to the single-ended transmission line 15, and the receiver 13 receives it via the single-ended signal VSOUT.

In particular, for stable transmission of the single-ended signal VSOUT, an end of a termination resistor RT is connected to the single-ended transmission line 15 and a termination voltage VTT is applied to the other end thereof. During the CTT, the termination voltage VTT is generally maintained at half a power supply voltage applied to the transmitter 11 and the receiver 13.

FIG. 2 illustrates an example of a conventional memory system that performs CTT on a pair of differential signals. In the memory system of FIG. 2, a pair of differential transmission lines 25a and 25b are installed between a transmitter 21 and a receiver 23. When the transmitter 21 is a memory device, the receiver 23 is a memory controller, and vice versa. The transmitter 21 outputs a pair of differential signals VDOUT and /VDOUT to the pair of differential transmission lines 25a and 25b, and the receiver 23 receives it via the pair of differential transmission lines 25a and 25b.

In particular, for stable transmission of the pair of differential signals VDOUT and /VDOUT, one end of each of termination resistors RT having the same resistance value is connected to one of the pair of differential transmission lines 25a and 25b, and a termination voltage VTT is applied to the other end of the each of the termination resistors RT. As in the memory system of FIG. 1, the termination voltage VTT is maintained to be half a power supply voltage VDDQ applied to the transmitter 21 and the receiver 23.

FIG. 3 illustrates another example of a conventional memory system that performs CTT on a pair of differential signals VDOUT and /VDOUT. In the memory system of FIG. 3, a termination resistor RT is installed between a pair of differential transmission lines 25a and 25b for stable transmission of the pair of differential signals VDOUT and /VDOUT.

As described above, in conventional memory systems, transmission lines are basically terminated at a voltage that is half a power supply voltage VDDQ applied to a transmitter and a receiver during the CTT for stable transmission of signals. Thus, voltages of signals on transmission lines are maintained to be half the power supply voltage VDDQ in a standby mode.

As shown in FIGS. 2 and 3, during the CTT of the pair of differential signals VDOUT and /VDOUT, their voltages are kept to be half the power supply voltage VDDQ, in the standby mode. In this case, it is difficult to determine the exact levels of signals input to the receiver 23. Accordingly, the receiver 23 has difficulty detecting valid transition of the levels of input signals; in particular, when operating frequencies of the input signals are high.

SUMMARY OF THE INVENTION

The present invention provides a memory system in which a pair of differential signals transmitted via a pair of transmission lines are prevented from being terminated at the same voltage in a standby mode, thereby preventing a receiver from entering an unstable state.

According to one aspect of the present invention, there is provided a memory system including a pair of transmission lines, a transmitter that outputs a pair of differential signals to the pair of transmission lines, and a receiver that receives the pair of differential signals via the pair of transmission lines. In the memory system of the invention, a first termination voltage can be applied to one of the pair of transmission lines, and a second termination voltage can be applied to the other transmission line, and the first termination voltage can be different from the second termination voltage.

One end of a first termination resistor may be connected to one of the pair of transmission lines, and the first termination voltage may be applied to the other end of the first termination resistor. One end of a second termination resistor may be connected to the other termination line, and the second termination voltage may be applied to the other end of the second termination resistor. A resistance value of the first termination resistor can be different from that of the second termination resistor, and the first termination voltage can be different from the second termination voltage.

According to another aspect of the present invention, there is provided a memory system including a single-ended transmission line, a pair of differential transmission lines, a transmitter that outputs a single-ended signal to the single-ended transmission line and a pair of differential signals to the pair of differential transmission lines, and a receiver that receives the single-ended signal via the single-ended transmission line and the pair of differential signals via the pair of differential transmission lines.

In the memory system, a first termination voltage can be applied to one of the pair of differential transmission lines, a second termination voltage can be applied to the other differential transmission line, and a third termination voltage can be applied to the single-ended transmission line. The first termination voltage can be different from the second termination voltage, and the third termination voltage can be half a power supply voltage applied to the transmitter.

An end of a first termination resistor can be connected to one of the pair of differential transmission lines, an end of a second termination resistor can be connected to the other differential transmission line, and an end of a third termination resistor can be connected to the single-ended transmission line. The first termination voltage can be applied to the other end of the first termination resistor, the second termination voltage can be applied to the other end of the second termination resistor, and the third termination voltage can be applied to the other end of the third termination resistor. A resistance value of the first termination resistor can be different from that of the second termination resistor, the first termination voltage can be different from the second termination voltage, and the third termination voltage can be half the power supply voltage applied to the transmitter.

In the memory system, when the transmitter is a memory device, the receiver is a memory controller, and vice versa.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
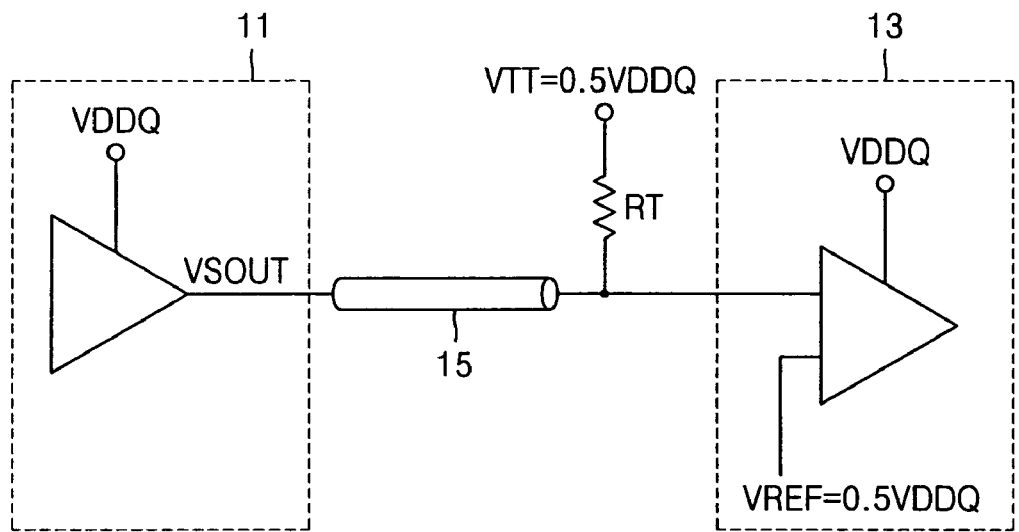
FIG. 1 illustrates a conventional memory system that performs center tab termination (CTT) on a single-ended signal.
Figure 2:
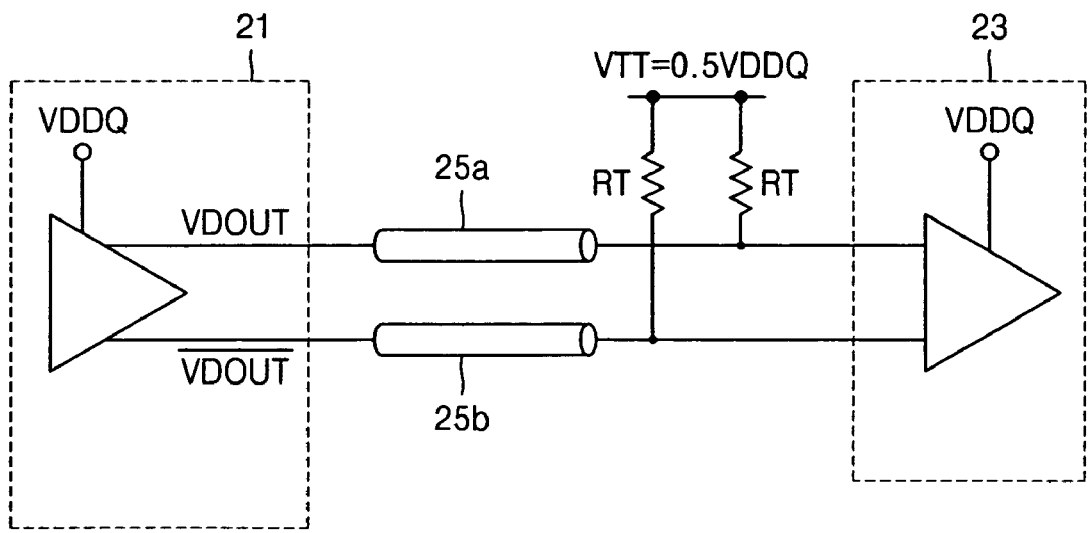
FIG. 2 illustrates one example of a conventional memory system that performs CTT on a pair of differential signals.
Figure 3:
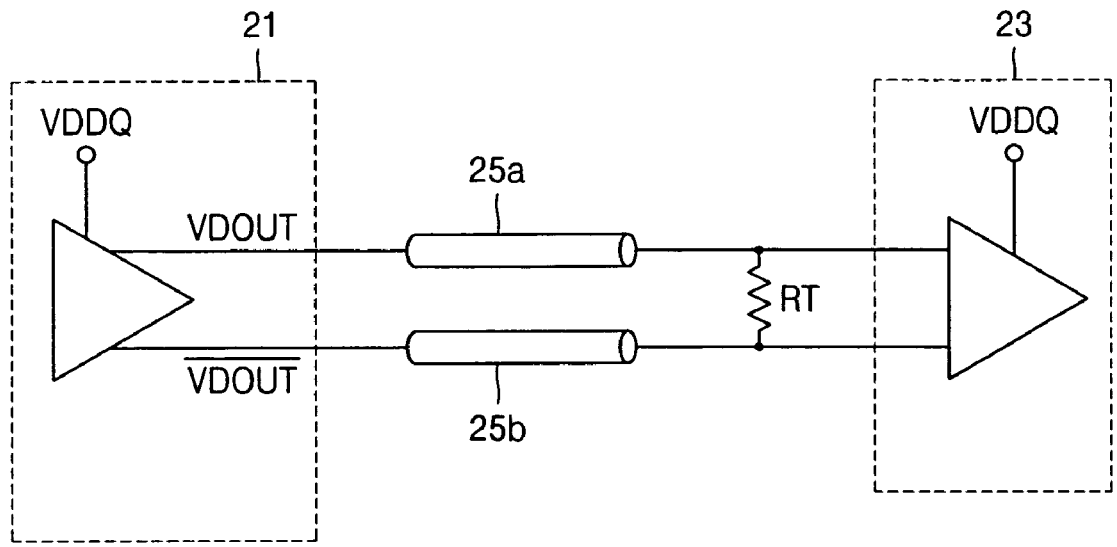
FIG. 3 illustrates another example of a conventional memory system that performs CTT on a pair of differential signals.
Figure 4:
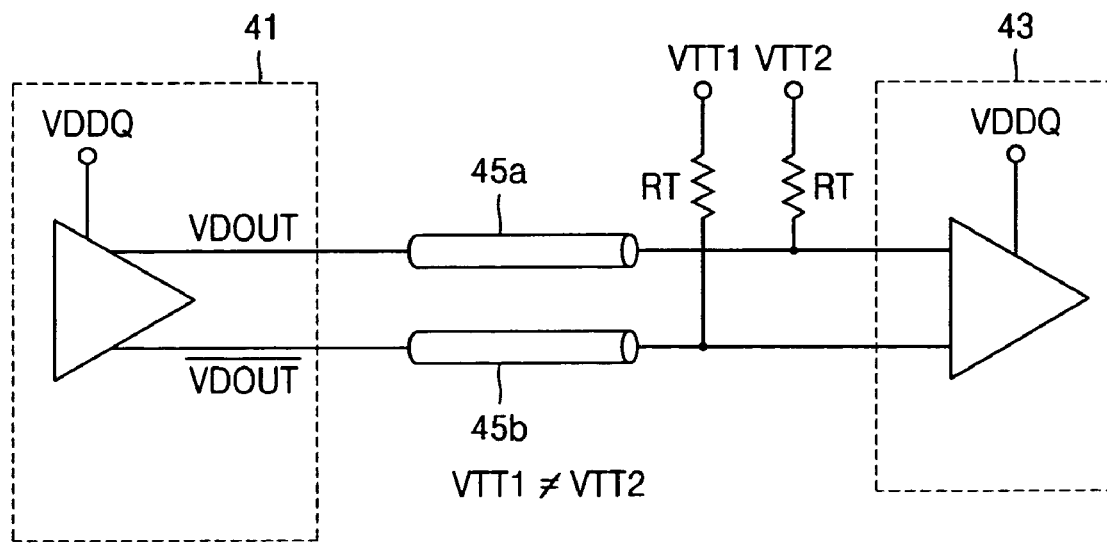
FIG. 4 illustrates a memory system according to an embodiment of the present invention.

FIG. 4 illustrates a memory system according to one embodiment of the present invention. In this embodiment, the memory system performs center tab termination (CTT) on only a pair of differential signals. The memory system of FIG. 4 includes a pair of transmission lines 45a and 45b, a transmitter 41 that outputs a pair of differential signals VDOUT and /VDOUT to the pair of transmission lines 45a and 45b, and a receiver 43 that receives the pair of differential signals VDOUT and /VDOUT via the pair of transmission lines 45a and 45b. When the transmitter 41 is a memory device, the receiver 43 is a memory controller, and vice versa.

In particular, one end of each of termination resistors RT having the same resistance value is connected to one of the differential transmission lines 45a and 45b. A first termination voltage VTT1 and a second termination voltage VTT2 with different voltage levels are applied to the other ends of the termination resistors RT, respectively. Accordingly, during a standby mode of the memory system, the pair of differential signals VDOUT and /VDOUT transmitted via the pair of transmission lines 45a and 45b are terminated at different voltages.

Figure 5:
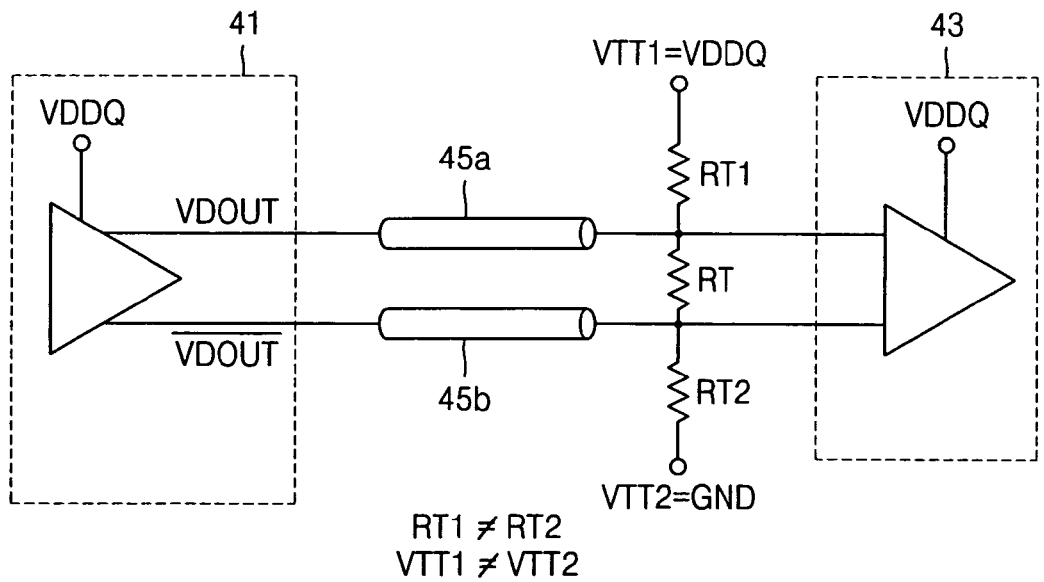
FIG. 5 illustrates a memory system according to another embodiment of the present invention.

FIG. 5 illustrates a memory system according to another embodiment of the present invention. In this embodiment, the memory system performs CTT on only a pair of differential signals. Like the memory system of FIG. 4, the memory system of FIG. 5 includes a pair of transmission lines 45a and 45b, a transmitter 41 that outputs a pair of differential signals VDOUT and /VDOUT to the pair of transmission lines 45a and 45b, and a receiver 43 that receives the pair of differential signals VDOUT and /VDOUT via the pair of transmission lines 45a and 45b.

Referring to FIG. 5, the differential transmission line 45a of the pair of differential transmission lines 45a and 45b is connected to an end of a first termination resistor RT1, and a first termination voltage VTT1 is applied to the other end thereof. The other differential transmission line 45b is connected to one end of a second termination resistor RT2, and a second termination voltage VTT2 is applied to the other end of the second termination resistor RT2. Also, a termination resistor RT is applied between the pair of transmission lines 45a and 45b.

A resistance value of the first termination resistor RT1 is determined to be different from that of the second termination resistor RT2. The first termination voltage VTT1 is maintained to be equivalent to a power supply voltage VDDQ applied to the transmitter 41 and the receiver 43. The second termination voltage VTT2 is maintained to be equivalent to a ground voltage GND applied to the transmitter 41 and the receiver 43. Accordingly, in a standby mode of the memory system, the pair of differential signals VDOUT and /VDOUT transmitted via the pair of transmission lines 45a and 45b are terminated at different voltages.

Figure 6:
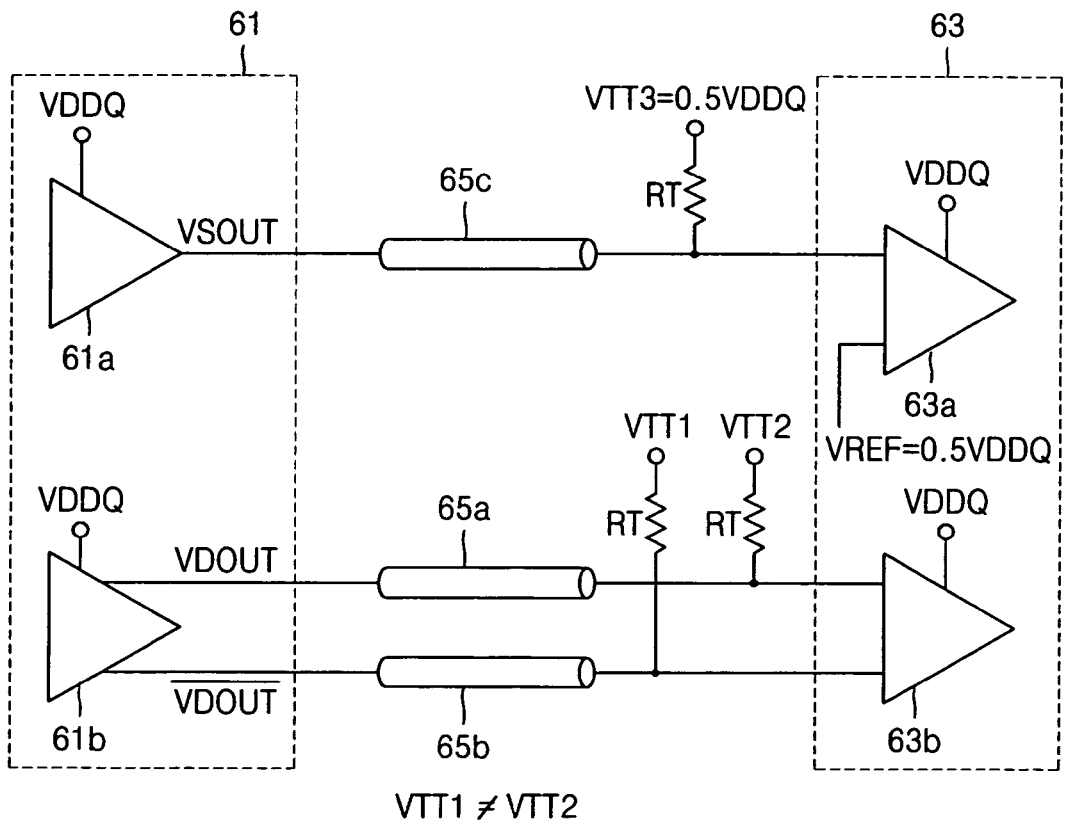
FIG. 6 illustrates a memory system according to yet another embodiment of the present invention.

FIG. 6 illustrates a memory system according to yet another embodiment of the present invention. In this embodiment, the memory system performs CTT on both the pair of differential signals and a single-ended signal.

The memory system of FIG. 6 includes a pair of differential transmission lines 65a and 65b, a single-ended transmission line 65c, a transmitting unit 61 that outputs a single-ended signal VSOUT to the single-ended transmission line 65c and a pair of differential signals VDOUT and /VDOUT to the pair of differential transmission lines 65a and 65b, and a receiving unit 63 that receives the single-ended signal VSOUT via the single-ended transmission line 65c and the pair of differential signals VDOUT and /VDOUT via the pair of differential transmission lines 65a and 65b.

The transmitting unit 61 includes a first transmitter 61a that outputs the single-ended signal VSOUT to the single-ended transmission line 65c, and a second transmitter 61b that outputs the pair of differential signals VDOUT and /VDOUT to the pair of differential transmission lines 65a and 65b. The receiving unit 63 includes a first receiver 63a that receives the single-ended signal VSOUT via the single-ended transmission line 65c, and a second receiver 63b that receives the pair of differential signals VDOUT and /VDOUT via the pair of differential transmission lines 65a and 65b.

If the transmitting unit 61 is a memory device, the receiving unit 63 is a memory controller, and vice versa.

In particular, one end of each of termination resistors RT having the same resistance value is connected to one of the pair of differential transmission lines 65a and 65b, and a first termination voltage VTT1 and a second termination voltage VTT2 are applied to the other ends of the termination resistors RT, respectively. The single-ended transmission line 65c is connected to one end of another termination resistor RT, and a third termination voltage VTT3 is applied to the other end thereof. The third termination voltage VTT3 is half a power supply voltage applied to the transmitting unit 61 and the receiving unit 63. During a standby mode of the memory system, the pair of differential signals VDOUT and /VDOUT transmitted via the pair of differential transmission lines 65a and 65b are terminated at different voltages.

Figure 7:
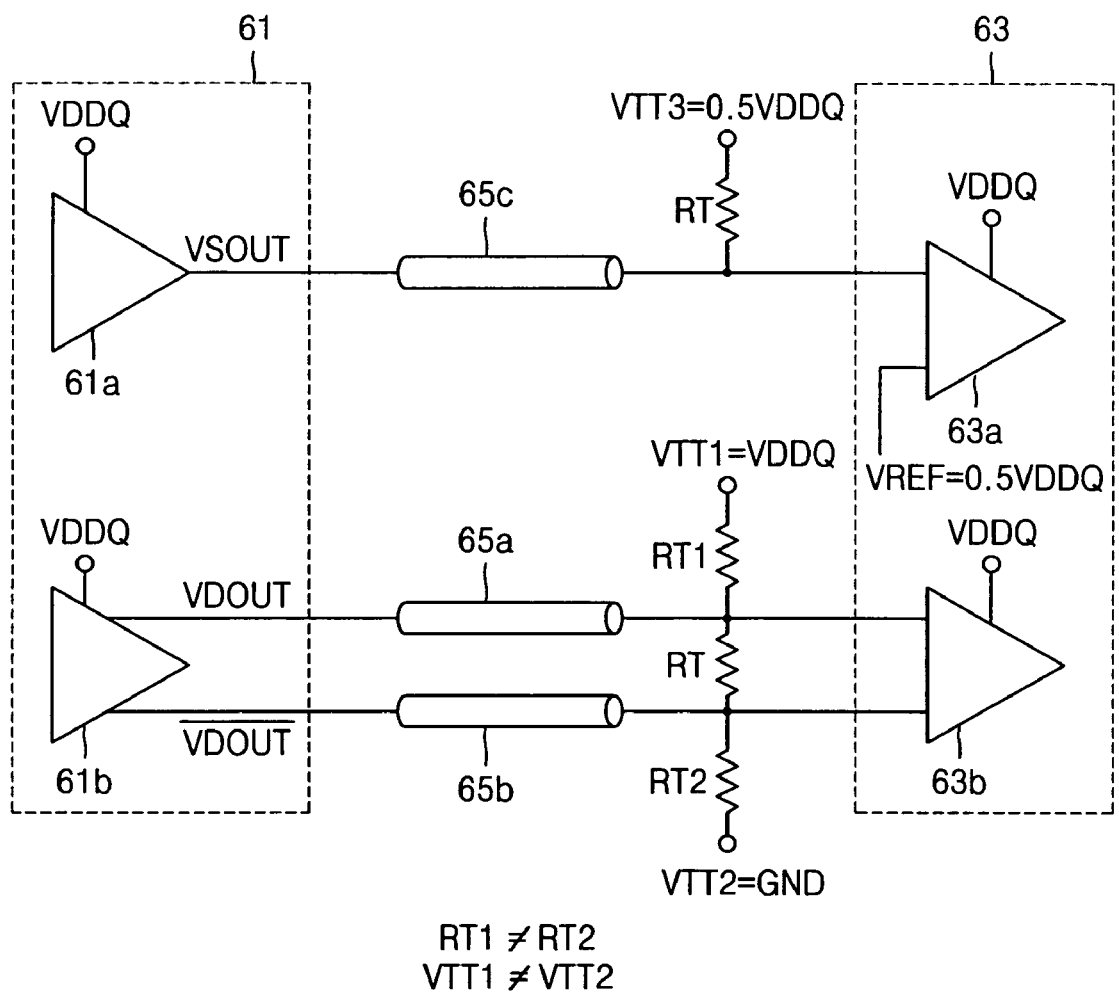
FIG. 7 illustrates a memory system according to still another embodiment of the present invention.

FIG. 7 illustrates a memory system according to still another embodiment of the present invention. In this embodiment, the memory system performs CTT on both a pair of differential signals and a single-ended signal.

Similar to the memory system of FIG. 6, the memory system of FIG. 7 includes a pair of differential transmission lines 65a and 65b, a single-ended transmission line 65c, a transmitting unit 61, and a receiving unit 63.

Referring to FIG. 7, the differential transmission line 65a of the pair of differential transmission lines 65a and 65b is connected to one end of a first termination resistor RT1, and a first termination voltage VTT1 is applied to the other end of the first termination resistor RT1. The other differential transmission line 65b is connected to one end of a second termination resistor RT2, and a second termination voltage VTT2 is applied to the other end of the second termination resistor RT2. A termination resistor RT is applied between the pair of transmission lines 65a and 65b.

A resistance value of the first termination resistor RT1 is determined to be different from that of the second termination resistor RT2. Also, the first termination voltage VTT1 is maintained to be equivalent to a power supply voltage VDDQ applied to the transmitting unit 61 and the receiving unit 63, and the second termination voltage is maintained to be equivalent to a ground voltage applied to the transmitting unit 61 and the receiving unit 63. The single-ended transmission line 65c is connected to one end of another termination resistor RT, and a third termination voltage VTT3 is applied to the other end thereof. The third termination voltage VTT3 is half the power supply voltage VDDQ applied to the transmitting unit 61 and the receiving unit 63. Accordingly, during a standby mode of the memory system, the pair of differential signals VDOUT and /VDOUT transmitted via the pair of differential transmission lines 65a and 65b are terminated at different voltages.

As described above, in a memory system according to the present invention, a pair of differential signals transmitted via a pair of differential transmission lines are terminated at different voltages during a standby mode of the memory system, thereby preventing a receiver from entering an unstable state. That is, the termination of the pair of differential signals at different voltages allows the receiver to determine the exact levels of the pair of differential signals transmitted via a pair of differential transmission lines. As a result, the receiver is capable of precisely detecting valid transition of the levels of the differential signals. Accordingly, the receiver can be readily designed to improve the efficiency of a channel bus, i.e., a signal transmission line.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A system comprising:
a single-ended transmission line;
a pair of differential transmission lines;
a transmitter outputting a single-ended signal to the single-ended transmission line and a pair of differential signals to the pair of differential transmission lines;
a receiver receiving the single-ended signal via the single-ended transmission line and the pair of differential signals via the pair of differential transmission lines;
a first termination voltage applied to one of the pair of differential transmission lines;
a second termination voltage applied to the other differential transmission line; and
a third termination voltage applied to the single-ended transmission line;
a first termination resistor, one end of which is connected to one of the pair of differential transmission lines;
a second termination resistor, one end of which is connected to the other of the pair of differential transmission lines;
a third termination resistor, one end of which is connected to the single-ended transmission line,
wherein the first termination voltage is different from the second termination voltage, and the third termination voltage is half a power supply voltage applied to the transmitter, and
wherein the resistance values of the first termination resistor, the second termination resistor and the third termination resistor are substantially equivalent.

2. The system of claim 1, wherein the transmitter is a memory device, and the receiver is a memory controller.

3. The system of claim 1, wherein the transmitter is a memory controller, and the receiver is a memory device.

4. A system comprising:
a single-ended transmission line;
a pair of differential transmission lines;
a transmitter outputting a single-ended signal to the single-ended transmission line and a pair of differential signals to the pair of differential transmission lines;
a receiver receiving the single-ended signal via the single-ended transmission line and the pair of differential signals via the pair of differential transmission lines;
a first termination resistor, one end of which is connected to one of the pair of differential transmission lines;
a second termination resistor, one end of which is connected to the other differential transmission line;
a third termination resistor, one end of which is connected to the single-ended transmission line;
a fourth termination resistor, one end of which is connected to one of the pair of differential transmission lines and the other end of which is connected to the other of the pair of differential transmission lines;
a first termination voltage applied to the other end of the first termination resistor;
a second termination voltage applied to the other end of the second termination resistor; and
a third termination voltage applied to the other end of the third termination resistor,
wherein a resistance value of the first termination resistor is different from a resistance value of the second termination resistor, a resistance value of the third termination resistor is substantially equivalent to a resistance value of the fourth termination resistor, the first termination voltage is different from the second termination voltage, and the third termination voltage is half a power supply voltage applied to the transmitter.

5. The system of claim 4, the transmitter is a memory device, and the receiver is a memory controller.

6. The system of claim 4, wherein the transmitter is a memory controller, and the receiver is a memory device.

* * * * *